(12) United States Patent
Vegulla et al.

(10) Patent No.: US 11,240,293 B2
(45) Date of Patent: Feb. 1, 2022

(54) SYSTEM FOR SUPPORTING REMOTE ACCESSES TO A HOST COMPUTER FROM A MOBILE COMPUTING DEVICE

(71) Applicant: VMware, Inc., Palo Alto, CA (US)

(72) Inventors: Praveen Vegulla, Cupertino, CA (US); Geoffrey Thomas Lywood, San Jose, CA (US); Olivier Alain Cremel, Los Altos, CA (US)

(73) Assignee: VMWARE, INC., Palo Alto, CA (US)

( * ) Notice: Subject to any disclaimer, the term of this patent is extended or adjusted under 35 U.S.C. 154(b) by 418 days.

(21) Appl. No.: 15/612,331

(22) Filed: Jun. 2, 2017

(65) Prior Publication Data

US 2017/0270108 A1   Sep. 21, 2017

Related U.S. Application Data

(63) Continuation of application No. 13/364,046, filed on Feb. 1, 2012, now Pat. No. 9,672,212.

(51) Int. Cl.
| | |
|---|---|
| *H04L 29/08* | (2006.01) |
| *G06F 9/451* | (2018.01) |
| *G06F 3/00* | (2006.01) |
| *G06F 9/54* | (2006.01) |
| *H04L 29/06* | (2006.01) |

(52) U.S. Cl.
CPC .............. *H04L 67/10* (2013.01); *G06F 3/00* (2013.01); *G06F 9/452* (2018.02); *G06F 9/54* (2013.01); *G06F 9/542* (2013.01); *G06F 9/543* (2013.01); *G06F 9/546* (2013.01); *H04L 67/125* (2013.01); *H04L 67/38* (2013.01)

(58) Field of Classification Search
CPC ....... H04L 67/10; H04L 67/42; H04L 67/025; H04L 67/34; H04L 41/22; G06F 9/45558; G06F 2009/45595; G06F 21/53; G06F 9/4445; G06F 9/45533; G06F 9/45545; G06F 17/3209
See application file for complete search history.

(56) References Cited

U.S. PATENT DOCUMENTS

| | | | |
|---|---|---|---|
| 2006/0267857 A1 | 11/2006 | Zhang et al. | |
| 2008/0057977 A1* | 3/2008 | Shostak | H04M 1/725 455/456.1 |
| 2011/0196864 A1* | 8/2011 | Mason | G06F 3/0416 707/728 |
| 2011/0314093 A1 | 12/2011 | Sheu et al. | |
| 2012/0092277 A1* | 4/2012 | Momchilov | G06F 3/038 345/173 |
| 2012/0197928 A1 | 8/2012 | Zhang et al. | |
| 2013/0067019 A1* | 3/2013 | Srinivas | G06F 9/452 709/213 |

* cited by examiner

*Primary Examiner* — Hitesh Patel
(74) *Attorney, Agent, or Firm* — Patterson & Sheridan, LLP

(57) ABSTRACT

Users of a client computer having non-conventional input devices interact with a host computing platform with the same user experience as if he or she was operating the client computer natively. This is achieved by having the non-conventional input devices of the client device appear local to the applications that are running on the host platform, even though the host computing platform may not be equipped with drivers for the non-conventional input devices.

9 Claims, 6 Drawing Sheets

SYSTEM FOR SUPPORTING REMOTE ACCESSES TO A HOST COMPUTER FROM A MOBILE COMPUTING DEVICE

CROSS-REFERENCE TO RELATED APPLICATIONS

This application is a continuation of U.S. application Ser. No. 13/364,046, filed Feb. 1, 2012 (now U.S. Pat. No. 9,672,212), which is incorporated by reference herein in its entirety.

BACKGROUND

Mobile computing devices, in recent years, have become powerful computing devices that can be used much like a desktop personal computer or a laptop computer. They have become essential tools for today's mobile workforce, providing remote accesses to enterprise-class servers through client terminal applications running thereon. For companies that have adopted Virtual Desktop Infrastructure® (VDI), which is available from VMware, Inc. of Palo Alto, Calif., client terminal applications may be installed on mobile computing device to enable access to virtual machines executing in centrally managed servers from the mobile computing devices.

The advantages of enabling remote access into centrally managed servers from mobile computing devices are obvious. It allows the users to stay connected to e-mail and document management applications without having them installed on their mobile computer devices. In addition, computational power available to the users is a function of what the servers can provide and not limited by the hardware installed in the mobile computing devices. Also, battery life of the mobile computing devices can be extended by off-loading heavy computational tasks to the servers. The job of system administrators is also simplified because they have greater control of firewalls, security patches, availability, and backups, as they do not have to manage different types of mobile hardware and software platforms. Finally, sensitive data can be safeguarded even in the event the mobile computing devices are lost or stolen by requiring passwords to access to the mobile computing devices and preventing the mobile computing devices from caching any sensitive data.

In addition to computing power, mobile computing devices have undergone significant improvements in user interface (UI) design. The enablers of these improvements have been non-conventional input devices such as multi-touch surfaces and an assortment of sensors, including GPS sensor, accelerometer, magnetic field sensor, orientation sensor, temperature sensor, barometric pressure sensor, and gyroscopic sensor. However, many of these non-conventional input devices are not fully enabled when the user accesses remote computing resources through client terminal applications running on their mobile computing devices even though their mobile computing devices are equipped with the non-conventional input devices. As a result, the user experience is quite different when the user is operating the mobile computing devices to access remote computing resources as compared to when they are operating the mobile computing devices natively.

There have been efforts to offer some of the UI features enabled by the non-conventional input devices, such as described in U.S. patent application Ser. No. 13/362,854, filed Jan. 31, 2012, entitled "MULTI-TOUCH INTERFACE GESTURE FOR KEYBOARD AND/OR MOUSE INPUTS". In the technique described therein, inputs from the non-conventional input devices are translated into mouse and keyboard events and processed by the remote computing resources as mouse and keyboard events. The obvious limitation of such a technique is that not all inputs from the non-conventional input devices can be translated into mouse and keyboard events. Moreover, even in situations where such inputs are translated, user experience is not accurately replicated.

SUMMARY

One or more embodiments of the present invention provide a system that allows users of a client computer, such as a mobile computing device, having non-conventional input devices to interact remotely with a host computing platform and have the same user experience as if he or she was operating the client computer natively. With this system, inputs from non-conventional input devices of the client device, such as multi-touch surfaces and an assortment of sensors, including GPS sensor, accelerometer, magnetic field sensor, orientation sensor, temperature sensor, barometric pressure sensor, and gyroscopic sensor are made to appear local to applications running on the host computing platform.

A method of supporting remote accesses to a server computer from a client computer, according to an embodiment of the invention, includes the steps of identifying input devices installed on the client device, configuring one or more queues into which events generated by the input devices installed on the client device are injected, injecting the events generated by the input devices into the queues as the events are received from the client device, notifying an application running in the server computer of some of the events injected into the queues, updating an output of the application according to the events of which the application is notified, and transmitting the updated output to the client device.

A virtualized computer system, according an embodiment of the invention, includes a plurality of virtual machines running in one or more server computers, wherein each virtual machine is remotely accessible by a computing device having input devices including a touch-based input device and sensors. Each virtual machine of this embodiment has executing therein a guest operating system configured to support touch-based input devices and sensors, a first guest application that coordinates communications with a computing device that is remotely accessing the virtual machine and configured to receive events from computing device and inject the events into one or more queues managed by the guest operating system, and a second guest application that is launched by the computing device and controlled by the computing device, wherein the second guest application is subscribed to some of the events injected into the queues by the first guest application and generates an output in accordance therewith.

A virtualized computer system, according another embodiment of the invention, includes a plurality of virtual machines running in one or more server computers, wherein each virtual machine is remotely accessible by a computing device having input devices including a touch-based input device and sensors. The computing device of this embodiment has executing therein an operating system configured to support touch-based input devices and sensors, and a client terminal application that coordinates communications with one of the virtual machines and is subscribed to events generated by the input devices, and configured to transmit to the virtual machine the events in native form along with a tag that identifies the input device that generated the event.

DETAILED DESCRIPTION

Figure 1:
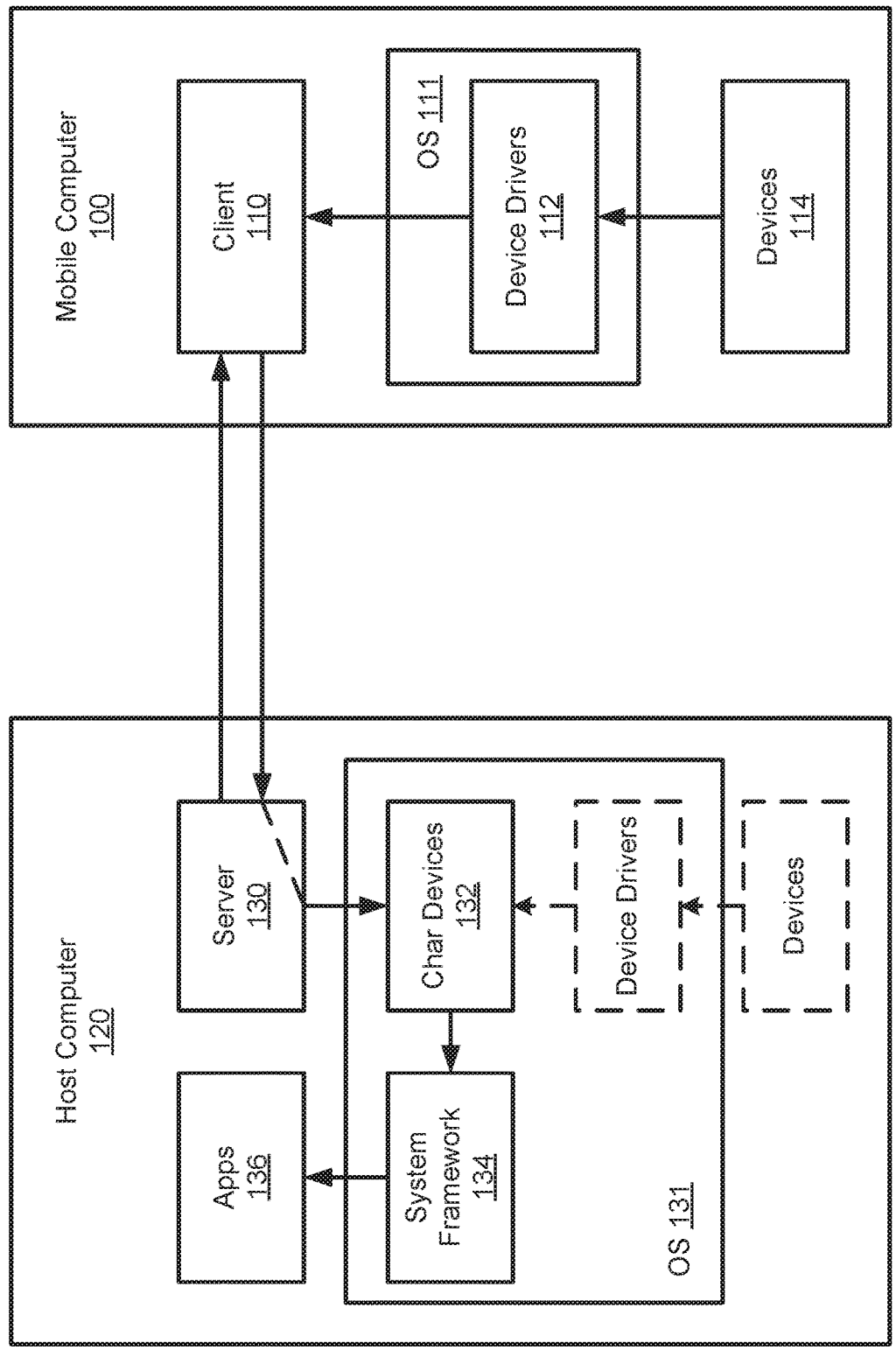
FIG. 1 is conceptual block diagram that illustrates components of a mobile computer and a host computer that implement one or more aspects of the present invention.

FIG. 1 is conceptual block diagram that illustrates components of a mobile computer 100 and a host computer 120 that implement one or more aspects of the present invention. Host computer 120 may be a physical machine or a virtual machine running on a physical machine. The embodiment where host computer 120 is a virtual machine is described below in conjunction with FIG. 4. As illustrated, mobile computer 100 has executing therein a client terminal application (client 110), and an operating system 111 that includes device drivers 112 for devices 114. Devices 114 of mobile computer 110 include conventional input devices such as mouse and keyboard and non-conventional input devices such as touch surfaces and an assortment of sensors, including GPS sensor, accelerometer, magnetic field sensor, orientation sensor, temperature sensor, barometric pressure sensor, and gyroscopic sensor. Operating system 111 may be any operating system that support both conventional and non-conventional input devices. Two examples are the Android® OS and Windows® 8 OS. Client 110 is an application that coordinates communications with host computer 100 when client 110 is accessing host computer 100, and is subscribed to events generated by the input devices. When client 110 receives notification of events from device drivers 112, client 110 transmits the events in their native form, without any translation, along with a tag that identifies the input device that generated the event. The protocol for communicating between client 110 and server 130 may be any technically feasible protocol including PC over IP and VNC (Virtual Network Computing).

Host computer 120 has executing therein a server application (server 130), other applications (apps 136), and an operating system 131. Operating system 131 may be any operating system that support both the conventional and non-conventional input devices, such as the Android® OS and Windows® 8 OS, and includes character devices 132 and system framework 134. It should be recognized that character devices are device objects of operating system 131 and distinguished from block devices. Character devices are queues that are used by operating systems as a gateway to corresponding device drivers. However, in the embodiments of the present invention described herein, non-conventional input devices are not physically present on host computer 120. For this reasons, these devices and their corresponding device drivers are shown in dashed boxes and not labeled. In one embodiment, character devices may be created using a kernel module known as uinput. Server 130 is an application that coordinates communications with mobile computer 100 when mobile computer 100 is remotely accessing host computer 100, and is configured to receive events generated by devices 114 of mobile computer 100 and inject the events into character devices 132.

In one embodiment, one character device is created for each input device of mobile computer 100. Thus, a separate queue is maintained for each input device of mobile computer 100. In other embodiments, a single queue is maintained for all input devices of mobile computer 100. In either case, the events are marked by tags that identify which input device of mobile computer 100 generated the event so that proper notification of the events can be given to subscribers to the events. For example, if an application is subscribed to events from a GPS sensor, the application is notified of such events each time server 130 injects such events into the character device for the GPS sensor. System framework 134 is a module running in operating system 131 that extracts the events from character devices 132 and notifies the subscribers to the events from such input device. In the case where a single character device is used for all events generated by the input devices of mobile computer 100, system framework 134 processes the tags in the events to identify the input device generating the event. After identifying the input device, system framework 134 notifies the subscribers to events from such input device. In the case where a separate character device is used for events generated by different input devices of mobile computer 100, server 130 processes the tags in the events to identify the input device generating the event and injects the events into the character device associated with the input device. After the injection, system framework 134 notifies the subscribers to events from such input device.

Apps 136 represent user-level applications that may have been remotely launched by client 110 and controlled according to inputs made by the user through input devices of mobile computer 100. Two examples of user-level application will be described below in conjunction with FIGS. 5 and 6. The first example is a cloud phone application and the second example is a 3D game application. Each of apps 136 may be subscribers to events generated by one or more of the input devices of mobile computer 100.

Figure 2:
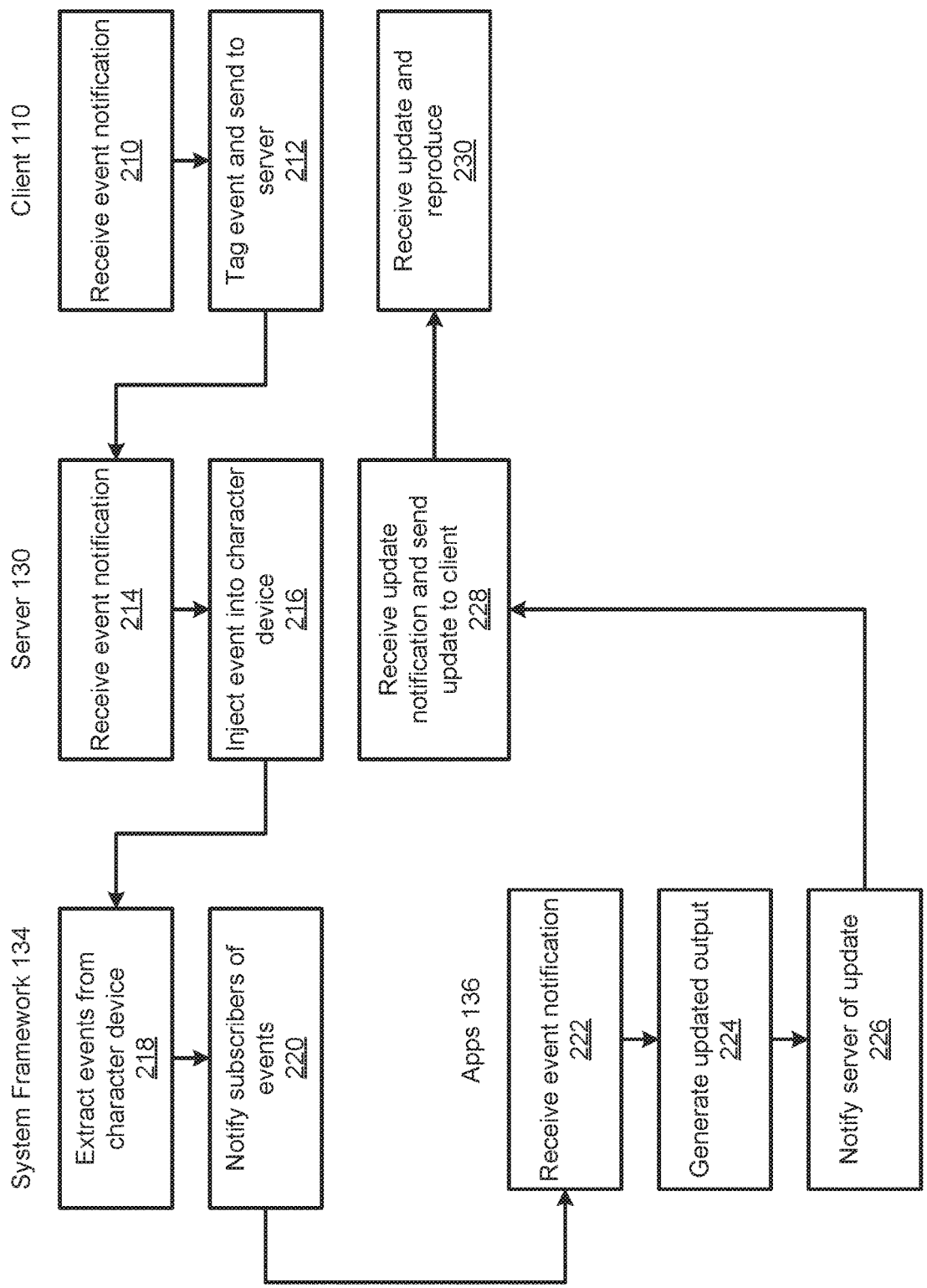
FIG. 2 is a flow diagram that illustrates the process of updating a user interface at the mobile computer based on events generated by input devices of the mobile computer and communicated to the host computer.

FIG. 2 is a flow diagram that illustrates the process of updating a user interface at the client computer based on events generated by input devices of the mobile computer and communicated to the host computer. This process begins at step 210 when client 100 receives notification that an input device to which it is subscribed has generated an event. In response, at step 212, client 110 tags the event with an identifier of the input device and sends the tagged event to server 130. At step 214, server 130 receives the event from client 110 and, at step 216, injects the event into the character device associated with the input device that generated the event. In the case where a single character device is used for all events generated by the input devices of mobile computer 100, server 130 injects all events from client 100 into the character device. On the other hand, in the case where a separate character device is used for events generated by different input devices of mobile computer 100, server 130 processes the tags in the events to identify the input device generating the event and injects the events into the character device associated with the input device.

At step 218, system framework 134 extracts events from the character devices as they are injected by server 130 and, at step 220, notifies subscribers to the events accordingly. As noted above, in the case where a single character device is used, system framework 134 processes the tags to identify the input device, whereas in the case where a separate character device is used for each input device of mobile computer 100, the tag processing is not needed.

In the embodiments of the present invention described herein, subscribers of events are apps 136. Upon receiving event notification from system framework 134 at step 222, the application (e.g., any one of apps 136) processes the event and generates an output, which is to be reproduced at mobile computer 100 at step 224. In the example of a cloud phone application, the output may be audio data received from a connected telephone. In the example of a 3D game application, the output may be display and audio data generated by the application in response to input events generated in response to user inputs at mobile computer 100. At step 226, the application notifies server 130 of the output. In response to this notification, server 130, sends the output to client 110, which at step 230, receives and reproduces the output.

Figure 3:
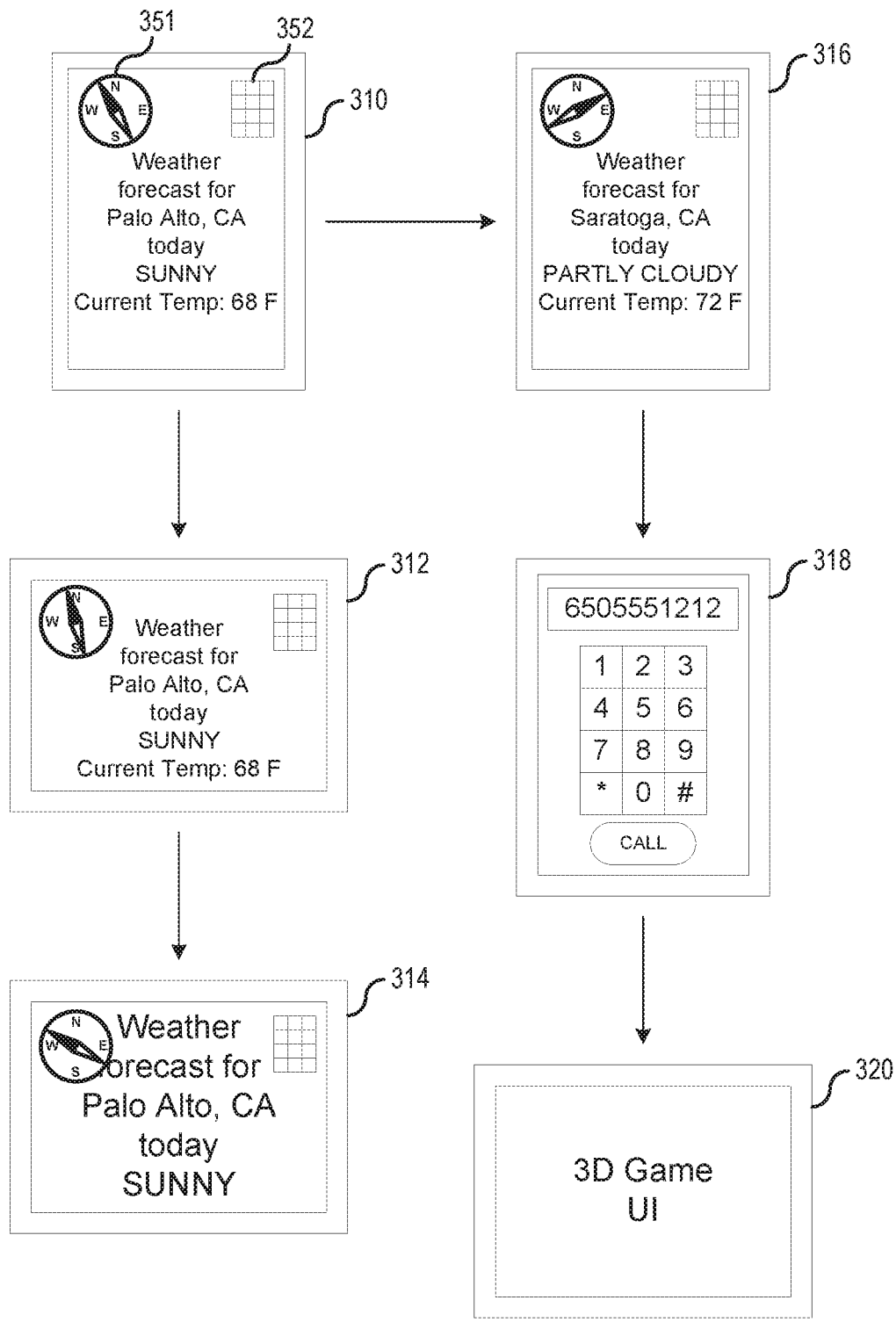
FIG. 3 provide examples of how the user interface at the mobile computer is updated based on events generated by input devices of the mobile computer and communicated to the host computer.

FIG. 3 provide examples of how the user interface at the mobile computer is updated based on events generated by input devices of the mobile computer and communicated to the host computer. Each diagram in FIG. 3 represents a display of mobile computer 100 in a different state. Diagram 310 represents the display held by the user in portrait mode (i.e., vertical dimension>horizontal dimension) while the user is in Palo Alto, Calif., and with mobile computer 100 pointed NNW. The portrait mode is detected by the orientation sensor. The user's current location is detected by the GPS sensor. The current temperature is detected by the temperature sensor. The pointing direction is detected by the magnetic field sensor. These detection events are sent to server 130 and processed according to the method described in conjunction with FIG. 2.

Diagram 312 shows what happens when the user changes the orientation of the display from portrait mode to landscape mode (i.e, vertical dimension<horizontal dimension). As shown, the pointing direction changed slightly towards N. It should be recognized that the updated UI is generated natively by host computer 120 and sent to mobile computer 100 to be reproduced by mobile computer 100. Because the updated UI is generated natively by host computer 120, the display positions of compass 351 and keypad icon 352 did not change.

Diagram 314 shows what happens when the user performs a zoom-in touch gesture on the multi-touch surface. As shown, the pointing direction changed slightly towards W. Again, the updated UI is generated natively by host computer 120 and sent to mobile computer 100 to be reproduced by mobile computer 100. As a result, the display positions and the sizes of compass 351 and keypad icon 352 did not change.

Diagram 316 shows what happens when the user travels from Palo Alto, Calif. to Saratoga, Calif.. The GPS sensor detects the change in location and the UI is updated by host computer 120 to reflect the change in location. In this example, the weather for Saratoga is displayed instead of the weather for Palo Alto. It should be noted that the pointing direction and the temperature changed as well in accordance with their new readings.

Diagram 318 shows what happens when the user selects keypad icon 352. In this embodiment, keypad icon 352 launches a cloud phone application at host computer 120. The display in diagram 318 represents the UI of cloud phone application generated by host computer 120 and sent to mobile computer 100 for reproduction.

Diagram 320 shows what happens when the user selects a 3D game application to be launched at host computer 120. The display in diagram 320 represents the UI of the 3D game application generated by host computer 120 and sent to mobile computer 100 for reproduction.

Figure 4:
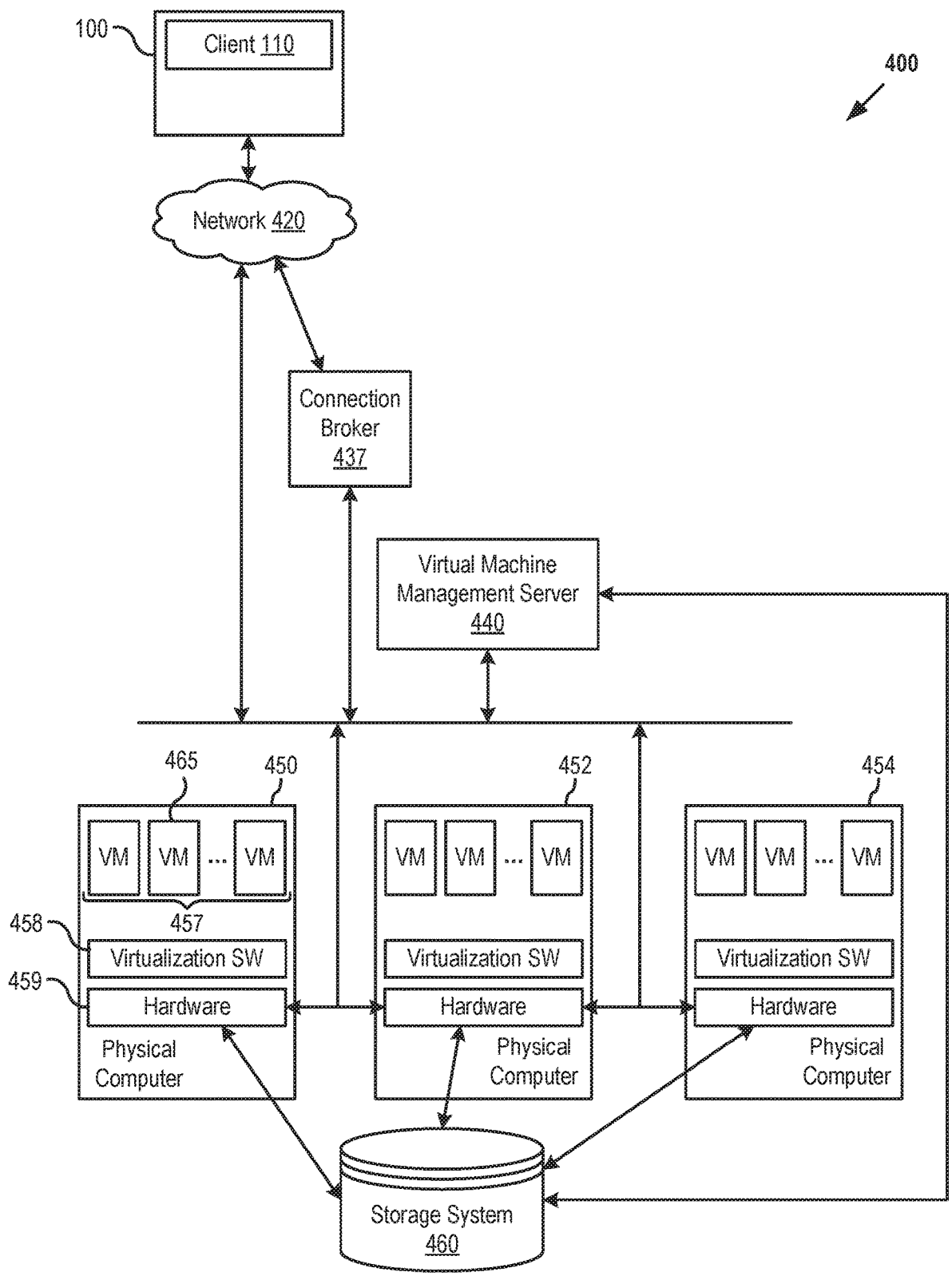
FIG. 4 is a block diagram of a virtualized computer system including virtual machines that are accessed remotely by mobile computers and configured to natively process events from non-conventional input devices.

FIG. 4 is a block diagram of a virtualized computer system 400 including virtual machines that are accessed remotely by mobile computers and configured to natively process events from non-conventional input devices installed in the mobile computers. In one embodiment, virtualized computer system 400 is VMware VDI and implemented as a cloud service.

In virtualized computer system 400, client terminal applications, e.g., client 110, run on operating systems of mobile computing devices, e.g., mobile computer 100. The client terminal applications provides an interface for the users to access their desktops and other computing services, which may be running in one of virtual machines 457 running in a data center or cloud computing center that is remote from the user locations. The term, "desktop" refers to the instance of an interactive operating environment provided by a computer operating system and software applications, typically in the form of a display and sound output and keyboard and mouse input, and according to embodiments of the present invention, multi-touch and sensor inputs.

Virtualized computer system 400 includes a connection broker 437 that manages connections between the client terminal applications and virtual machines 457. In the embodiments of the present invention illustrated herein, desktops and other computing services are running in virtual machines 457 and virtual machines 457 are instantiated on a plurality of physical computers 450, 452, 454, each of which includes virtualization software 458 and hardware 459, is controlled by a virtual machine management server 440, and is coupled to a shared persistent storage system 460.

All of the components of virtualized computer system 400 communicate via network 420. For simplicity, a single network is shown but it should be recognized that, in actual implementations, the components of virtualized computer system 400 may be connected over the same network or different networks. With the client terminal applications, users can access desktops and other computing services running in a remote data center or cloud computing center through network 420, from any location.

Figure 5:
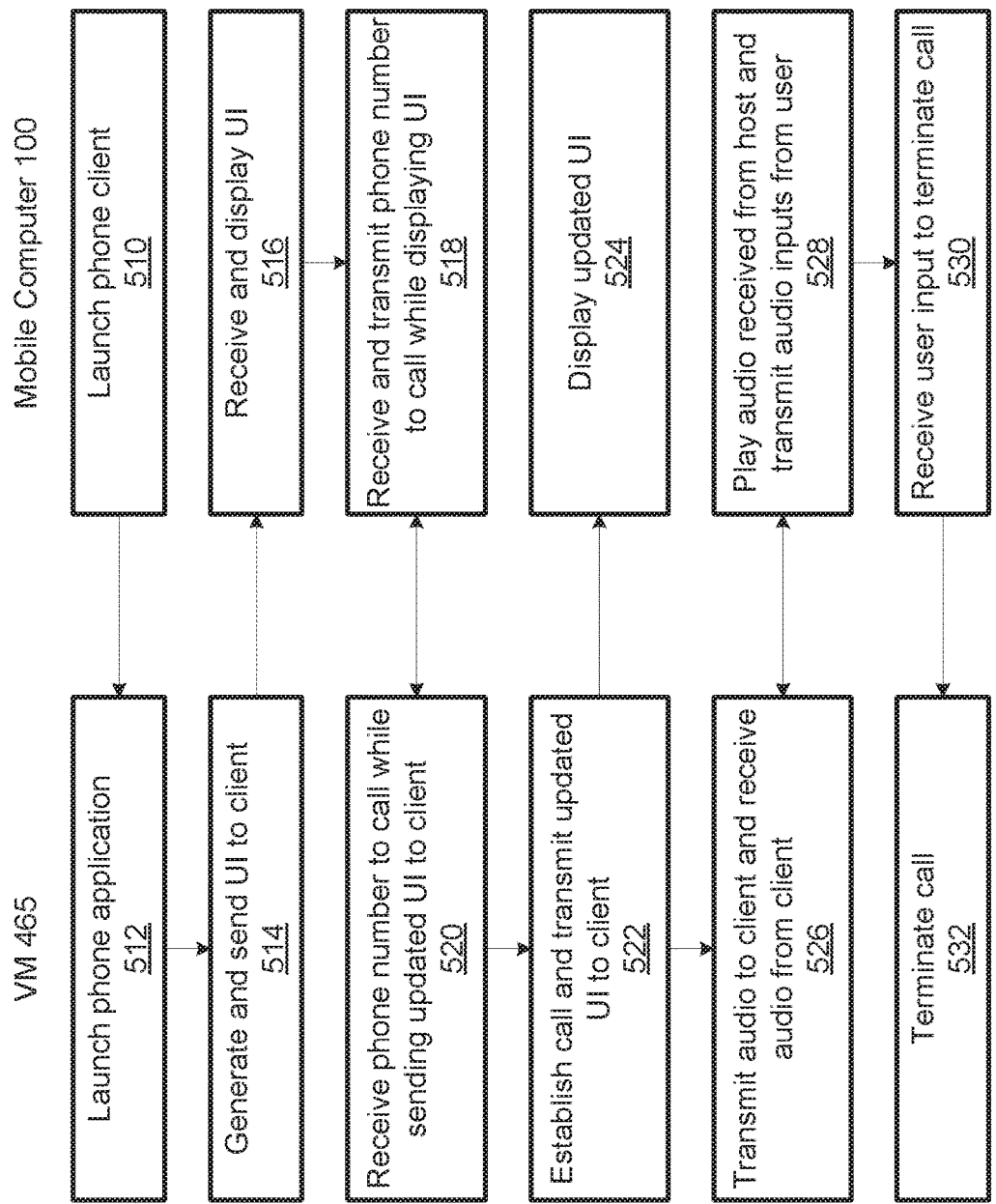
FIG. 5 is a flow diagram illustrating the method steps performed by a virtual machine and a mobile computer during a cloud phone session.

FIG. 5 is a flow diagram illustrating the method steps performed by a mobile computer (e.g., mobile computer 100) and a VM running in a virtualized computer system that is accessed by the mobile computer (e.g., VM 465) during a cloud phone session. This method begins at step 510 when the user of mobile computer 100 launches a phone client locally. In response to this, VM 465 launches a phone application at step 512. VM 465 then generates a phone user interface (UI) and sends it to mobile computer 100 to be displayed locally on mobile computer 100 (step 514). At step 516, mobile computer 100 displays the UI on its touch screen. Steps 518 and 520 depict what happens as the user inputs a phone number to call into the UI. For each number pressed on the touch screen of mobile computer 100, this touch input event is transmitted to VM 465. In response to each such input event, VM 465 updates the UI to display the number just pressed and transmits the updated UI to mobile computer 100 for display on its touch screen. It should be recognized that the input event generated through a multi-touch input device is transmitted to VM 465 and processed natively by VM 465 in accordance with the method described above in conjunction with FIG. 2.

At step 522, VM 465 establishes the call with the called party and updates the UI to reflect the established call. The updated UI is displayed at mobile computer 100 at step 524. Steps 526 and 528 depict what happens during the established call session. At step 526, VM 465 functions as the intermediary between the called party and mobile computer 100. More specifically, VM 465 receives audio input events from mobile computer 100 and the phone application processes them to transmit audio data corresponding to those audio input events to the called party. In the other direction, VM 465 receives audio data from the called party and transmits them to mobile computer 100, which replays the audio data locally.

The user terminates the call at step 530, e.g., by touching an "END CALL" button displayed on the UI. This causes a touch event to be generated at mobile computer 100 and transmitted to VM 465. In response to this touch event, VM 465 terminates the call. It should be recognized that the touch event transmitted to VM 465 is processed natively by VM 465 in accordance with the method described above in conjunction with FIG. 2.

Figure 6:
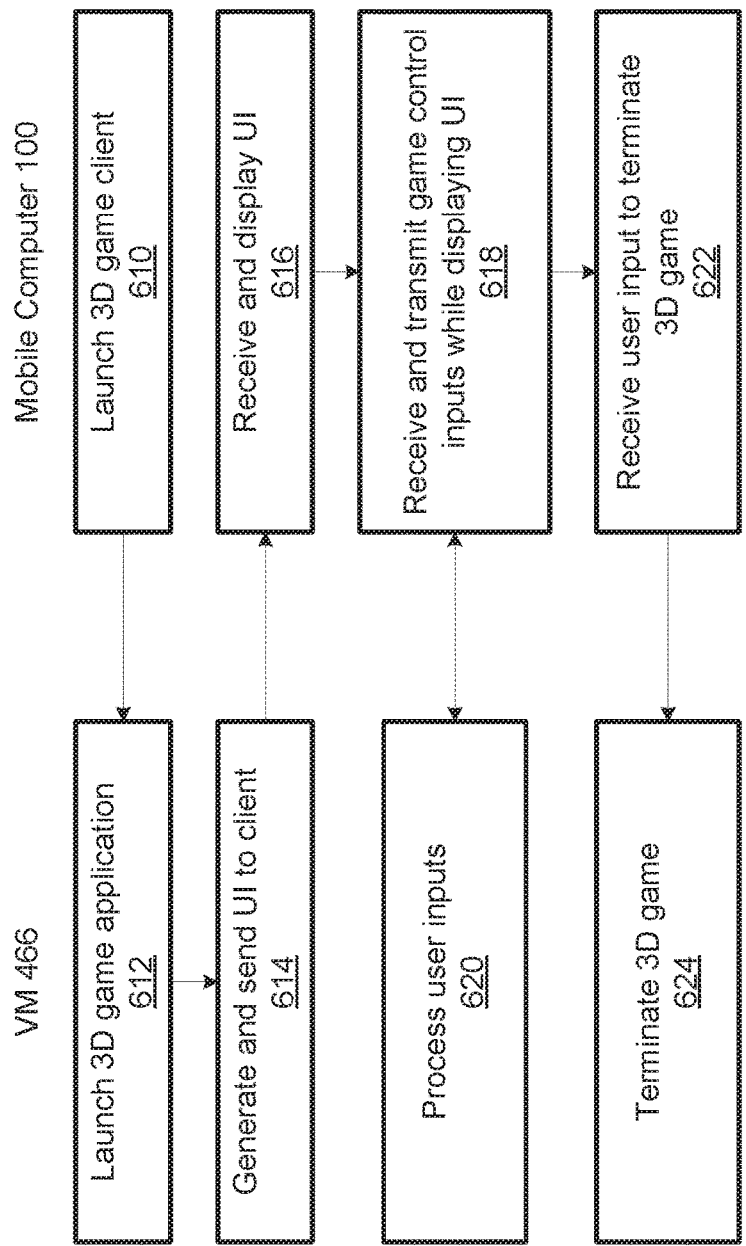
FIG. 6 is a flow diagram illustrating the method steps performed by a virtual machine and a mobile computer during a 3D game session.

FIG. 6 is a flow diagram illustrating the method steps performed by a mobile computer (e.g., mobile computer 100) and a VM running in a virtualized computer system that is accessed by the mobile computer (e.g., VM 465) during a 3D game session. This method begins at step 610 when the user of mobile computer 100 launches a 3D game locally. In response to this, VM 465 launches a 3D game application at step 612. VM 465 then generates a 3D gaming user interface (UI) and sends it to mobile computer 100 to be displayed locally on mobile computer 100 (step 614). At step 616, mobile computer 100 displays the UI on its touch screen. Steps 618 and 620 depict what happens as the user is playing the 3D game. At step 618, mobile computer 100 detects user inputs as the user operates game controls through various input devices. In the example described herein, the input devices that the user is controlling include a multi-touch surface and microphone. In response to these inputs, mobile computer 100 generates input events and the input events are transmitted to VM 465. It should be recognized that the input events generated by mobile computer 100 are transmitted to VM 465 and processed natively by VM 465 in accordance with the method described above in conjunction with FIG. 2. In particular, 3D game application at step 620 processes these input events, generates an updated UI, and transmits the updated UI to mobile computer 100. When the updated UI is received at mobile computer 100, mobile computer 100 displays them on the touch screen of mobile computer 100 as the updated UI for the 3D game application.

The user terminates the game at step 622, e.g., by selecting an "EXIT" option through multi-touch inputs. This causes touch events to be generated at mobile computer 100 and transmitted to VM 465. In response to these touch events, VM 465 terminates the 3D game application. It should be recognized that the touch events transmitted to VM 465 are processed natively by VM 465 in accordance with the method described above in conjunction with FIG. 2.

Additional embodiments of the present invention rely on one or more position sensors, such as a GPS sensor, implemented on mobile computer 100 to enable location based applications. For example, in hospitals that are configured with virtualized computer system 400, medical staff may employ mobile computer 100 to access patient charts that are stored and managed by centralized servers. As the medical staff moves from room to room, mobile computer 100 automatically retrieves the chart of the patient in the current room in accordance with the sensed position.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A virtualized computer system, comprising:
a virtual machine executing in a server computer, wherein the virtual machine is remotely accessible by a computing device having input devices including a touch-based input device and sensors, the virtualized computer system comprising:
  a guest operating system executing in the virtual machine configured to support the touch-based input devices and the sensors;
  a first guest application executing in the virtual machine that coordinates communications with the computing device that is remotely accessing the virtual machine and configured to receive events from the computing device and inject the events into one or more queues managed by the guest operating system; and
  a second guest application executing in the virtual machine that is launched by the computing device and controlled by the computing device, wherein the second guest application is subscribed to some of the events injected into the one or more queues by the first guest application and generates an output in accordance therewith.

2. The virtualized computer system of claim 1, wherein the one or more queues are character devices.

3. The virtualized computer system of claim 2, wherein each of the character devices does not have an associated device driver.

4. The virtualized computer system of claim 3, wherein a character device is configured for each of the input devices.

5. The virtualized computer system of claim 1, wherein the second guest application is an application for making and receiving telephone calls and the events the second guest application is subscribed to are generated by microphone inputs at the computing device and the output that is generated includes audio from a connected telephone.

6. The virtualized computer system of claim 1, wherein the second guest application is a three-dimensional (3D) game application and the events the second guest application is subscribed to are generated by touch-based inputs at the computing device and the output that is generated includes 3D graphics and audio.

7. The virtualized computer system of claim 1, wherein the first guest application is further configured to extract a tag from each event and determine the input device that is associated with the event.

8. A virtualized computer system, comprising:
a virtual machine running in a server computer, wherein the virtual machine is remotely accessible by a computing device having input devices including a touch-based input device and sensors, the virtualized computer system comprising:
  an operating system, executing in the computing device, configured to support the touch-based input devices and sensors; and
  a client terminal application, executing in the computing device, configured to coordinate communications with the virtual machine, the virtual machine being subscribed to events generated by the input devices, the client terminal application configured to transmit to the virtual machine the events in native form along with a tag that identifies the input device that generated the event.

9. The virtualized computer system of claim 8, wherein the sensors include any of global positioning system (GPS) sensor, accelerometer, magnetic field sensor, orientation sensor, temperature sensor, barometric pressure sensor, and gyroscopic sensor.

* * * * *